(12) United States Patent
Waring et al.

(10) Patent No.: US 6,390,795 B1
(45) Date of Patent: May 21, 2002

(54) APPARATUS FOR EVERTING A TUBE

(75) Inventors: Stephen T. Waring, Davis, CA (US); Steven R. Leffler, Keizer, OR (US)

(73) Assignee: rePipe Holdings, Inc., Houston, TX (US)

(*) Notice: Subject to any disclaimer, the term of this patent is extended or adjusted under 35 U.S.C. 154(b) by 0 days.

(21) Appl. No.: 09/599,820

(22) Filed: Jun. 21, 2000

(51) Int. Cl.⁷ ............................................... B29C 63/36
(52) U.S. Cl. ..................... 425/11; 138/98; 264/36.17; 425/387.1
(58) Field of Search ............................... 425/11, 387.1; 264/36.17; 138/98

(56) References Cited

U.S. PATENT DOCUMENTS

| | | | |
|---|---|---|---|
| 4,043,157 A | 8/1977 | Schiffer | 68/5 E |
| 4,064,211 A | 12/1977 | Wood | 264/95 |
| 4,077,610 A | 3/1978 | Masuda | 254/134.4 |
| 4,368,091 A | 1/1983 | Ontsuga et al. | 156/287 |
| 4,385,885 A | 5/1983 | Wood | 425/387.1 |
| 4,427,480 A | 1/1984 | Kamuro et al. | 256/287 |
| 4,581,085 A | 4/1986 | Wood | 156/156 |
| 4,668,125 A | 5/1987 | Long, Jr. | 405/154 |
| 4,685,983 A | 8/1987 | Long, Jr. | 156/64 |
| 4,883,557 A | 11/1989 | Morinaga et al. | 156/287 |
| 4,948,452 A | 8/1990 | Morinaga et al. | 156/382 |
| 5,154,936 A | 10/1992 | Driver et al. | 425/182 |
| 5,223,204 A | 6/1993 | Endoh | 264/516 |
| 5,358,359 A | 10/1994 | Long, Jr. | 405/154 |
| 5,374,174 A | 12/1994 | Long, Jr. | 425/11 |
| 5,490,964 A | 2/1996 | Kamiyama et al. | 264/36 |
| 5,520,484 A | 5/1996 | Kamiyama et al. | 405/154 |
| 5,597,353 A | 1/1997 | Alexander, Jr. | 425/387 |
| RE35,944 E | 11/1998 | Driver et al. | 264/570 |
| 5,942,183 A | 8/1999 | Alexander, Jr. | 264/516 |

FOREIGN PATENT DOCUMENTS

JP          1-204726         8/1989

OTHER PUBLICATIONS

Gelco Grouting Service, Demonstration Project of the Gelco Remedial Waterstop to Rehabilitate Monolith Joint Waterstops at Pine Flat Dam in Fresno County, California, 1985 (cover, unnumbered pages labeled Step 1, Step 2, Step 3, and Finished Remedial Waterstop, and pp. 32–39).
Gelco Grouting Service, Pressure Pot, Jun. 5, 1985, 4 pages of drawings.
Waring, three photographs, 1998.
Waring, Launcher (five sheets of drawings), Oct. 1998.
Leffler, "Air Inverter Flapper Valve Detail." (Two sheets of drawings.) Nov. 2, 1998.

*Primary Examiner*—James P. Mackey
(74) *Attorney, Agent, or Firm*—Jackson Walker LLP

(57) ABSTRACT

An apparatus for use in installing a liner in a conduit as part of a repair procedure, including a sealing inlet port for passage of the tubular liner into an enclosed zone where an increased pressure is maintained to move the tubular liner into the conduit and to evert it as it moves along the conduit. A clamp holds one end of the liner to the outlet side of an everter box. The sealing inlet port includes a pair of lips to press against the opposite sides of a flattened liner. Support members may be used to keep the lips from being forced back out toward the outside of the pressurized everter box, and to control friction between the lips and the liner.

37 Claims, 16 Drawing Sheets

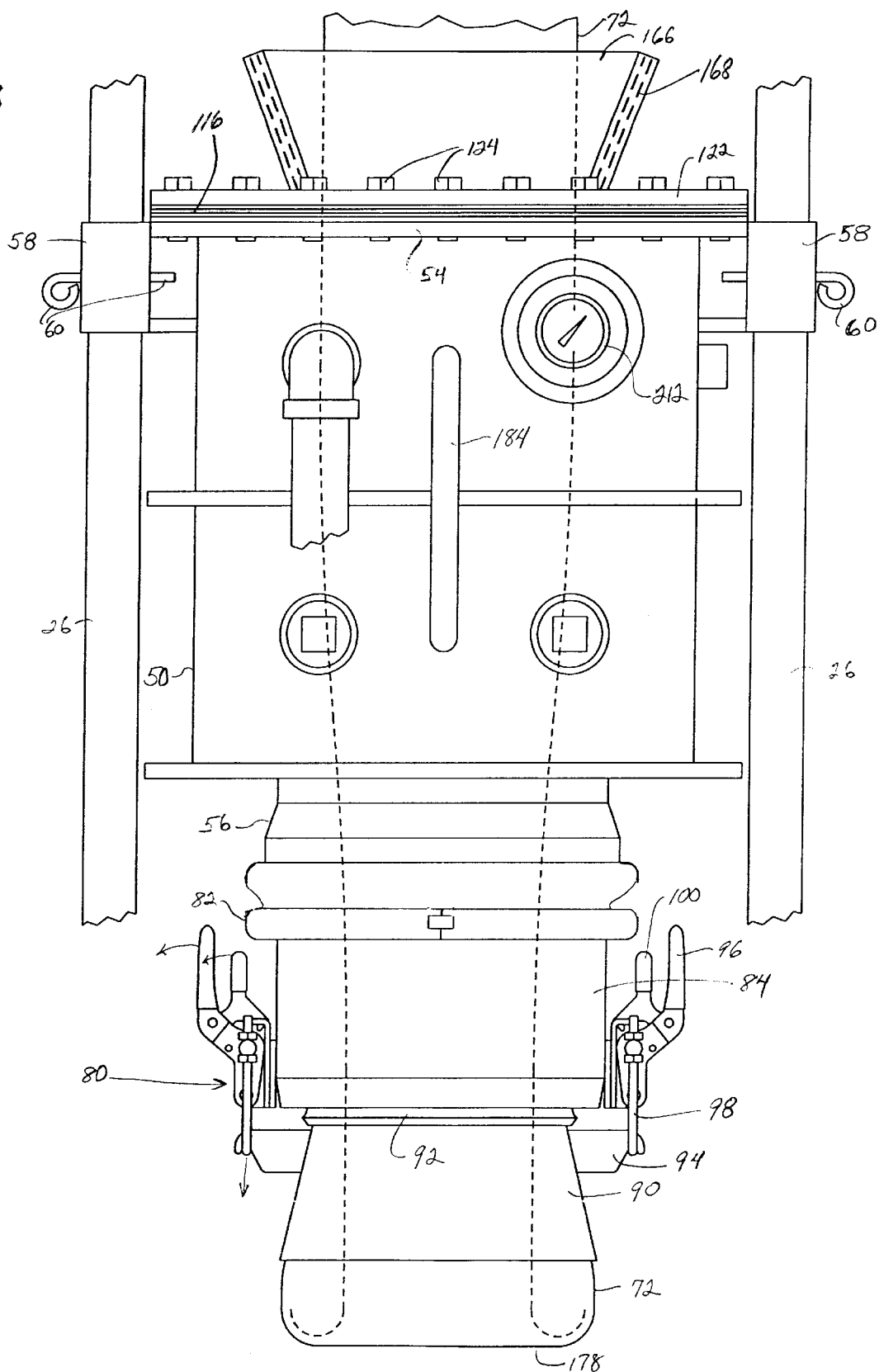

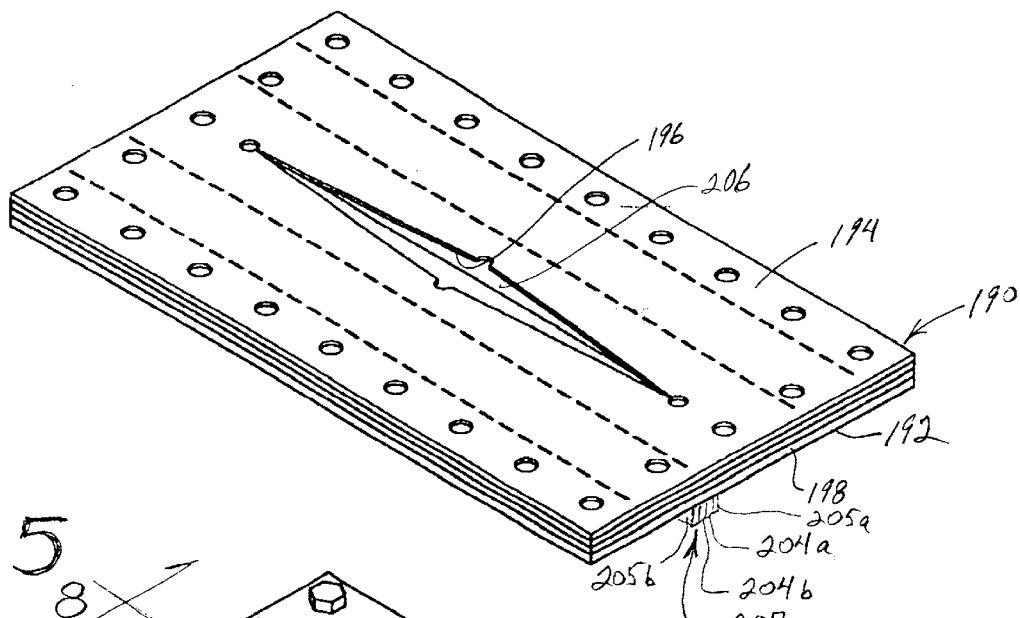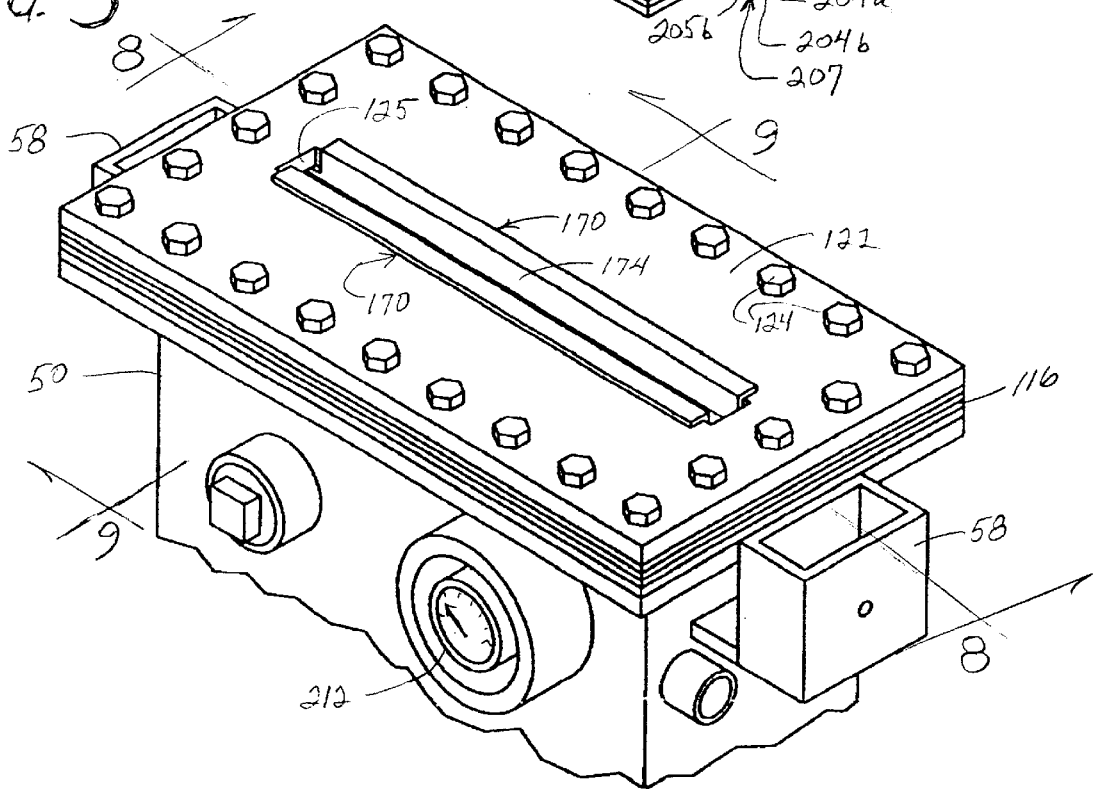

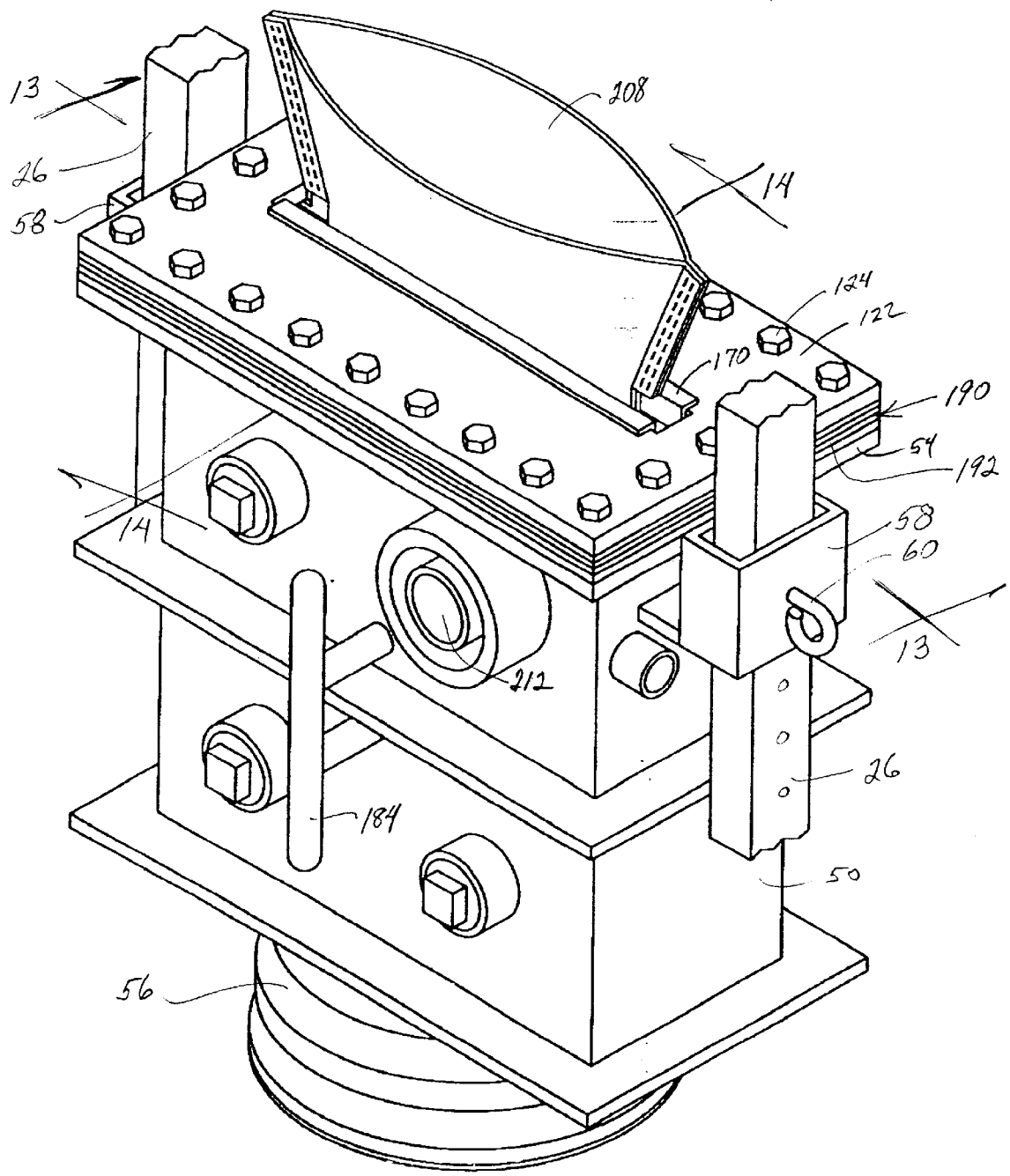

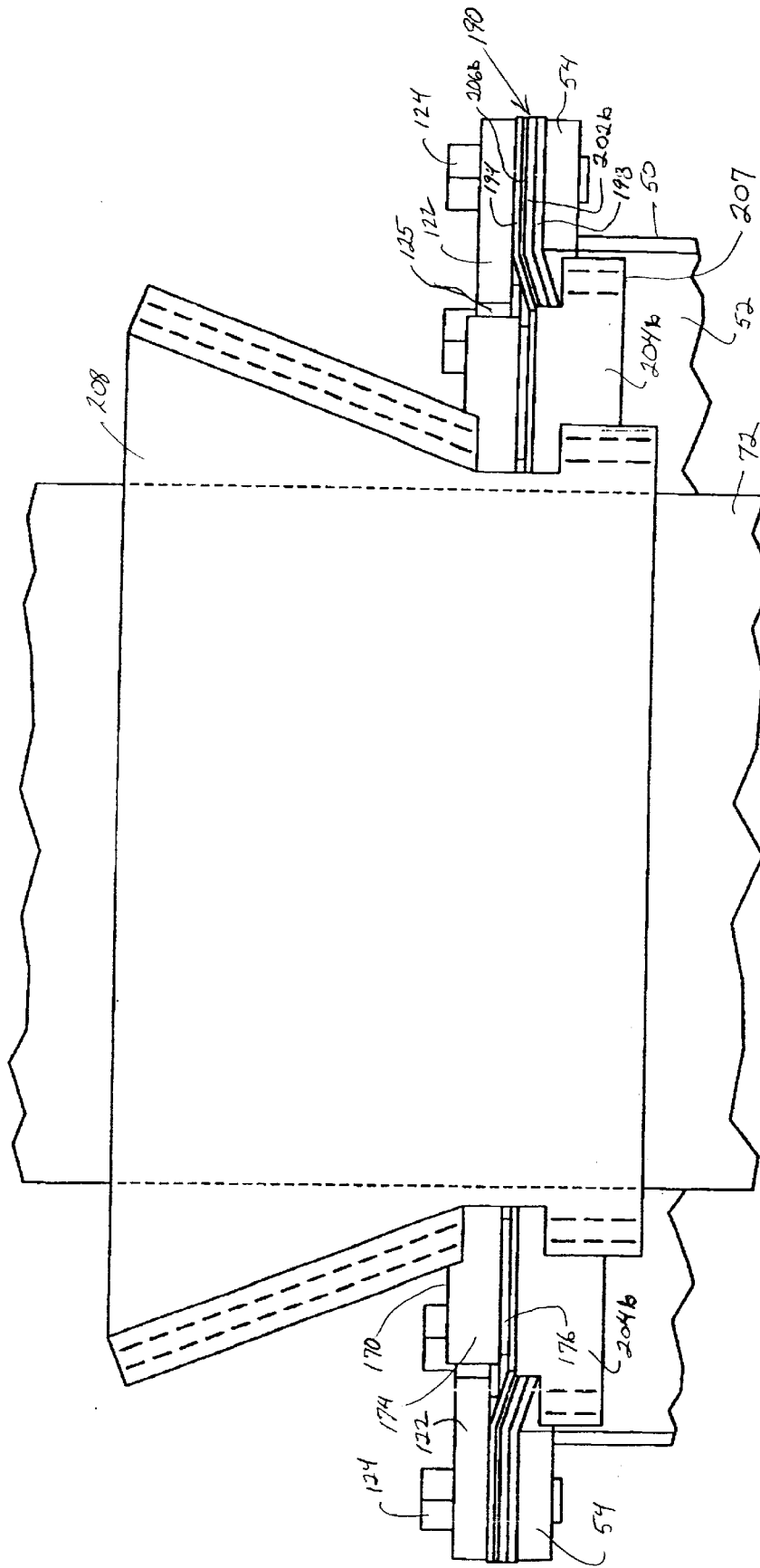

APPARATUS FOR EVERTING A TUBE

BACKGROUND OF THE INVENTION

The present invention relates to an apparatus for everting a flexible tube liner into the interior of a hollow tubular conduit, such as a previously existing underground sewer pipe.

One of the more successful pipe repair or rehabilitation processes which is currently used is described in Wood, U.S Pat. No. 4,064,211. Wood, U.S. Pat. No. 4,385,885 discloses apparatus useful in installing a liner according to the process described in U.S. Pat. No. 4,064,211, and briefly mentions, but does not describe, a lip seal, used in conjunction with a pair of controlled rollers to feed a liner into a conduit that is to be repaired. Various other sealing devices have been disclosed for use in connection with using fluid under pressure to evert a liner and extend it into a conduit to be repaired, as shown, for example, in Alexander, Jr., U.S. Pat. Nos. 5,597,353 and 4,942,183, Long, Jr., U.S. Pat. No. 5,358,359, Driver, et al., U.S. Pat. Nos. 5,154,936 and Re. 35,944.

Other apparatus for use in installing and everting a liner, as disclosed in Long, Jr., U.S. Pat. Nos. 4,668,125 and 4,685,983, has been quite large, and has avoided the use of a seal to maintain pressure within a portion of an apparatus by instead using a relatively tall column of water to provide the necessary fluid pressure within the liner being everted. Such apparatus has been undesirably unwieldy and expensive.

What is desired, then, is to provide a conveniently small and inexpensive apparatus useful to evert and install a flexible tubular liner into a conduit quickly and efficiently.

BRIEF SUMMARY OF THE INVENTION

The present invention supplies an answer to the aforementioned need for a relatively small and inexpensive apparatus for use in installing a flexible tubular liner in a conduit, by providing a sealing inlet port for admitting a liner in the form of a flattened flexible tube into a pressurized chamber of an apparatus for everting and extending such a flexible tube into position for use to repair or line a conduit. The apparatus includes a container for holding air or another fluid under pressure to act on the flexible tube. The sealing inlet port is provided in the container to allow the liner to enter the container in a flattened configuration without significant loss of pressure, so that the pressure of the fluid in the container can be used to evert and extend the tubular liner into the required position within a conduit.

The sealing inlet port in one embodiment of the invention includes a base defining an elongate narrow mouth, and a pair of associated lips extend for a distance from the base, facing each other. In use of the sealing port, fluid under pressure surrounding the lips urges the lips together and against an object such as the flattened flexible tube passing through the sealing inlet port, to seal the inlet port yet allow the flexible tube to slide between the lips.

In a preferred embodiment of the invention the sealing inlet port can provide a sealing effect while permitting a rope, a lay-flat hose, a strap, or a cable to slide between the lips.

In a preferred embodiment of the sealing inlet port an elongate support member is fastened to each of the lips to keep them in the necessary positions and prevent them from being expressed from within the container of fluid under pressure.

In one embodiment such elongate support members are urged apart from each other, urging respective portions of the lips apart from each other to limit friction between the lips and the flattened liner tube.

In accordance with the invention the lips provide a sealing closure around the flattened tube being everted, but the lips are short enough and are supported sufficiently by the support members that the friction between the lips and the tube is small enough so that the pressure in the container, urging the lips toward each other and the tube, is sufficient to cause the tube to extend and be everted to a desired length.

In one embodiment of the invention a cover plate provides support for the base to which the lips are attached, and associated shutters provide a slot having an adjustable size extending through the cover plate.

In one preferred embodiment of the invention the apparatus includes a liner everter box having the sealing inlet port at its top end and including an outfeed opening at its bottom end, through which the flexible liner tube can proceed out from the liner everter box.

In one preferred embodiment of the invention a clamp associated with the outfeed opening from the liner everter box includes a conical inner clamping surface surrounded by a circular outer clamping seat or rim, together with linkages holding the two together to grip an end portion of a flexible tube between the conical inner clamping face and the surrounding clamping rim.

In one preferred embodiment of the invention a support frame holds the liner everter box in an appropriate position so that an everted liner extending from the outfeed opening can be directed conveniently to the appropriate position to enter into a conduit needing to be repaired.

In one embodiment of the invention the support frame includes adjustable legs, adjustable wheeled struts, and a mounting arm adapted to be received in a trailer hitch receiver on a motor vehicle.

In another preferred embodiment of the invention a pair of guide rollers are mounted on the support frame above the liner everter box.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a front elevational view of the everter box and its outlet fixture, together with upright portions of the supporting structure shown in FIG. 1.

FIG. 5 is an isometric view taken from the upper right front corner of the everter box shown in FIG. 1, at an enlarged scale.

FIG. 11 is an isometric view taken from the upper right front corner of the everter box shown in FIG. 1, at an enlarged scale, showing upright portions of the support structure and a funnel-like liner-guiding assembly associated therewith.

FIG. 12 is an isometric view of an inlet seal assembly which is an alternative embodiment of the present invention.

FIG. 13 is a sectional view, taken along line 13—13 of FIG. 11, showing the inlet seal shown in FIG. 12 installed in the upper end of the everter box, together with the liner-guiding assembly.

Figure 1:
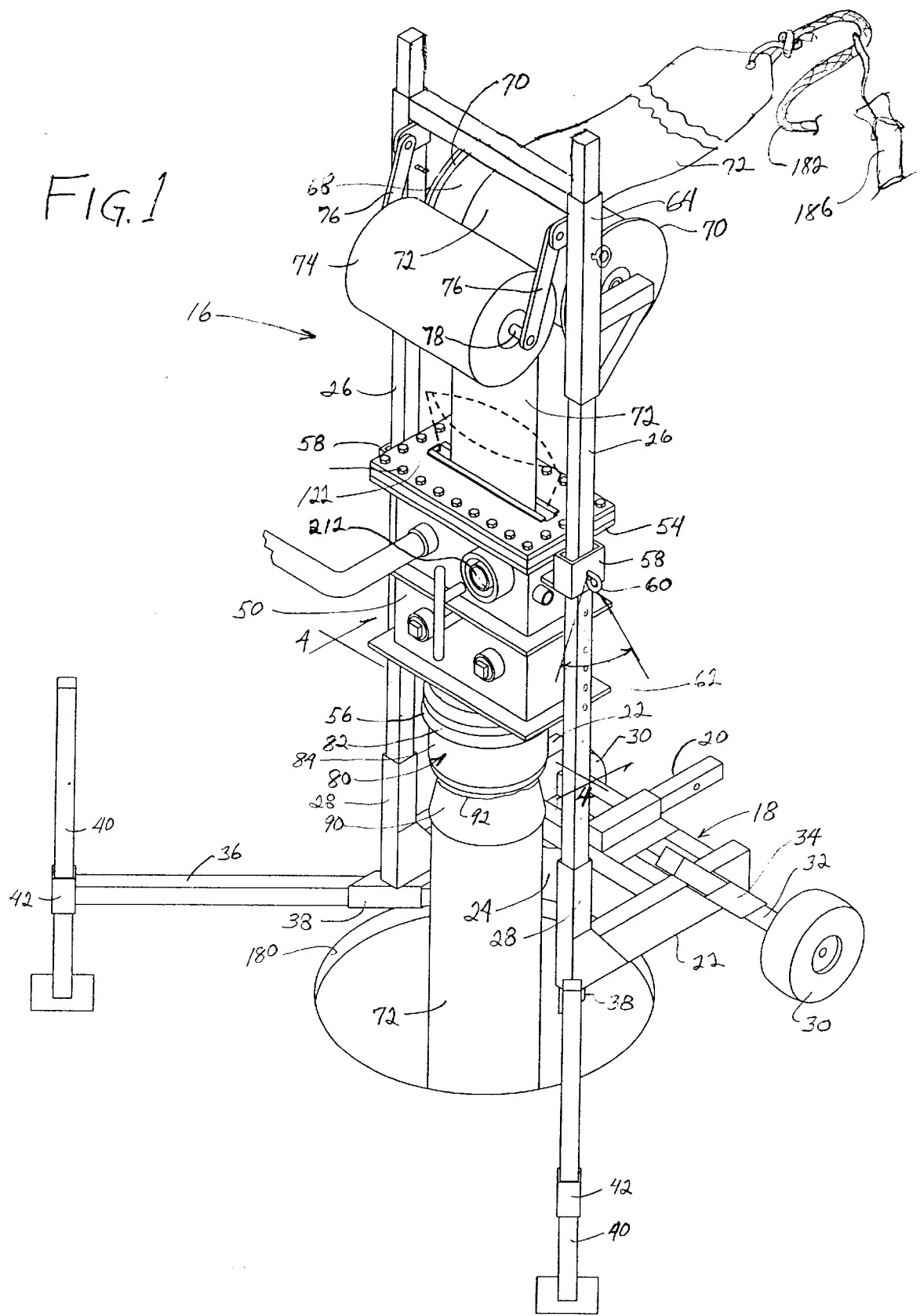
FIG. 1 is an isometric view showing a tube everter apparatus which is one embodiment of the present invention.

DETAILED DESCRIPTION OF THE
PREFERRED EMBODIMENTS

Referring now to the drawings which form a part of the disclosure herein, an everter apparatus 16 which is one preferred embodiment of the present invention includes a frame 18 of metal, preferably aluminum, including a mounting arm 20 adapted to fit and be fastened in a trailer hitch receiver of a motor vehicle. A pair of longitudinal side members 22 are spaced apart from each other and define an open space 24 therebetween. A pair of upright support members 26, preferably of steel tubing, each extend upward from a respective one of the side members 22 and may be attached to the side members 22 by fitting within respective sleeve-like sockets 28.

Figure 2:
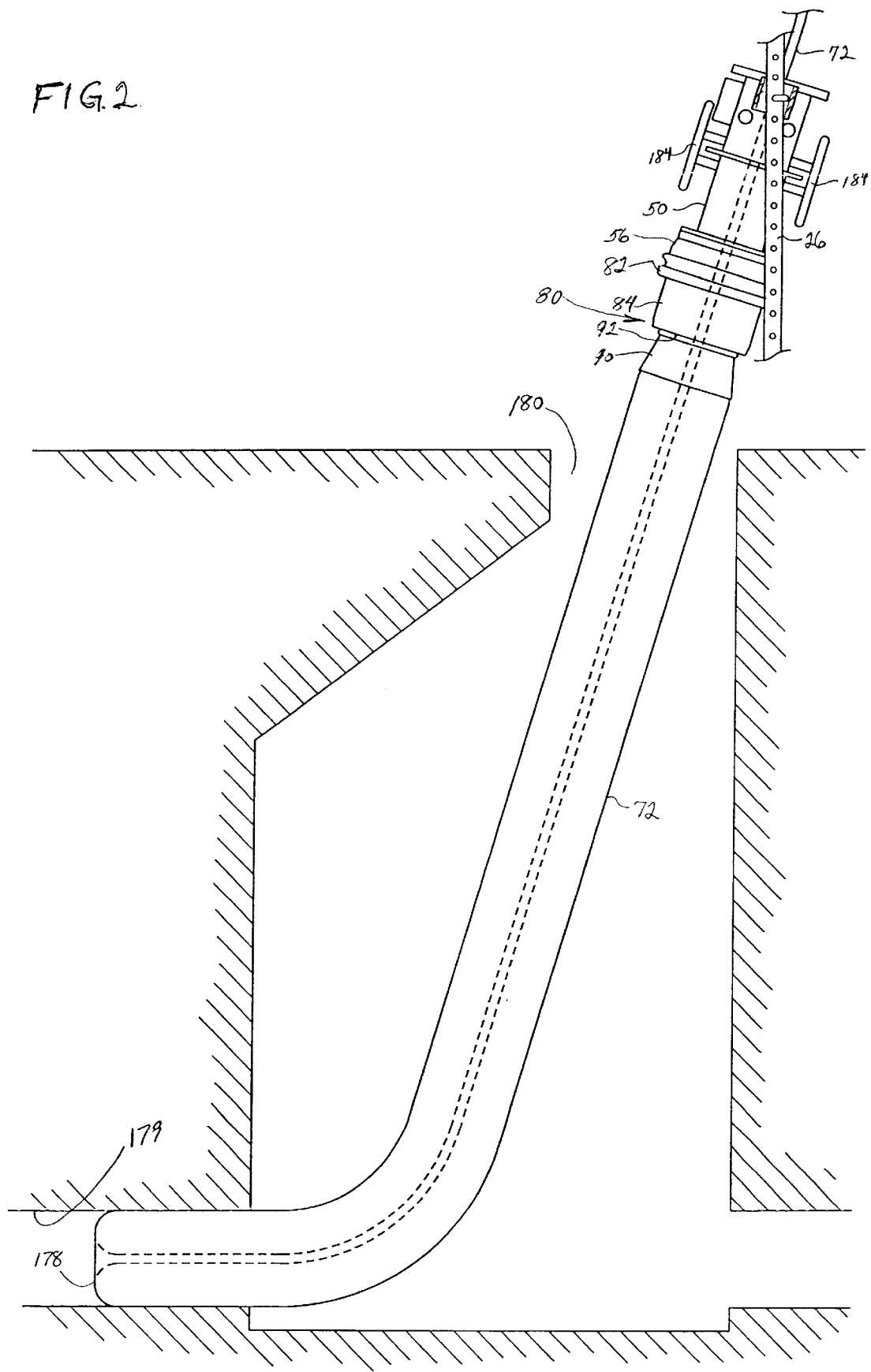
FIG. 2 is a semi-diagrammatic representation illustrating the manner in which the apparatus shown in FIG. 1 may be used to install a liner tube into a conduit extending from a manhole.

A pair of ground wheels 30, which may have rubber tires, are mounted rotatably on respective struts 32, each fastened to a respective one of the side members 22, as by being mounted adjustably within a respective support sleeve 34. A respective one of a pair of horizontal extension members 36 is attached to each of the side members 22 by a horizontal sleeve 38. Each of the sleeves 38 extends diagonally outward from a respective one of the side members 22 on which it is mounted. A respective vertical support leg 40 is adjustably held within a mounting sleeve 42 on each of the horizontal extension members 36. The vertical support legs 40 may be adjusted by locking pins and corresponding boles, to rest on the ground and support the side members 22 so that the frame 18 is suitably supported where a flexible tube is to be installed, such as, for example, a location where the open space 24 is located above a manhole, as illustrated in FIG. 2.

Located between the upright support members 26 is a liner everter box 50 which, for light weight, is manufactured of aluminum plates welded together to form a generally rectangular container 52 including a flange 54 at its top end and having a generally tubular outfeed fixture 56 mounted on its bottom end. The everter box 50 is attached to the upright support members 26 by a pair of mounting sleeves 58 attached to opposite sides of the container 52 and fitting loosely about the upright support members 26. Horizontal mounting pins 60 extend through respective coaxial bores defined in each mounting sleeve 58 and corresponding bores in the upright support members 26, allowing the liner everter box 50 to pivot about an axis defined by the mounting pins 60, through an angle 62 with respect to the upright support members 26.

A moveable subframe 64 is attached removably to the upright support members 26 a convenient distance above the mounting sleeves 58 and supports a first generally cylindrical roller 68 for rotation about a generally horizontal axis that extends parallel with the axis defined by the mounting pins 60. The roller 68 has a pair of flanges 70 each extending radially from the surface of the roller 68 at a respective one of its opposite ends. The roller 68 is mounted in a fixed location with respect to the subframe 64.

A second roller 74 is also carried on the moveable subframe 64, to which it is attached by a pair of similar parallel swing arms 76 between which a roller shaft 78 extends. The second roller 74 is similar in its diameter to the size of the roller 68, but is slightly shorter in length, so that the second roller 74 fits between the flanges 70, allowing the peripheral surface of the second roller 74 to move into contact with the peripheral surface of the roller 68. Ordinarily, during use of the everter apparatus 16, a prepared liner tube 72 to be installed in a conduit being repaired extends over the first roller 68 and thence down through a liner passage space established between the first roller 68 and the second roller 74 merely by moving the second roller 74. The weight of the second roller 74, acting through the swing arms 76, urges the second roller 74 against such a liner tube 72, holding it neatly and appropriately in place along the peripheral surface of the first roller 68.

Attached to the outfeed fixture 56 at the bottom end of the container 52 is a liner attachment clamp 80, held in place by a fastening collar 82, with a gasket 83 included between the fixture 56 and the liner attachment clamp 80 to provide a seal to retain pressure. The attachment clamp 80 may be constructed in various sizes and is used in a size particular to the size of the liner tube 72 to be installed, to retain the first, or near end 92 of the liner tube 72 and create a tight seal between the liner tube 72 and the interior of the container 52. Pressure can then be applied to the fluid within the interior of the container 52 to evert the liner tube 72 and force it to extend into position within the conduit which is to be repaired using the everter apparatus 16. To that end, the attachment clamp 80 includes an upper sleeve portion 84, shown in section view in FIG. 4, which fits snugly within the lower end of the outfeed fixture 56. A radially outwardly extending flange of the upper sleeve portion 84 fits against the lower end of the outfeed fixture 56, and radially inwardly extending flanges of the collar 82 hold the upper sleeve 84 together with the lower end of the outfeed fixture.

An outer clamping seat 86 is located at the bottom end of the upper sleeve 84 and extends radially inward in the form of a rim, defining a circular opening, in the embodiment shown.

An inner tubular portion 90 is frusto-conical and has an open upper end that is smaller than its lower end and also smaller than the opening. The upper end is also small enough to fit a short distance into the open near end 92 of the liner 72.

At least two ears 94 extend radially outward from the exterior of the inner tubular portion of the attachment clamp 80, and correspondingly located clamp lever arms 96 are mounted on the upper sleeve portion 84. Each clamp lever arm 96 carries a U-shaped bail 98 of adjustable length as well as a latching hook 100, so that when the bail 98 engages a respective gear 94 and the clamp lever arm 96 is raised, the latching hook 100 can engage a corresponding shoulder on a mounting base 102 on the outside of the upper sleeve 84.

Figure 4:
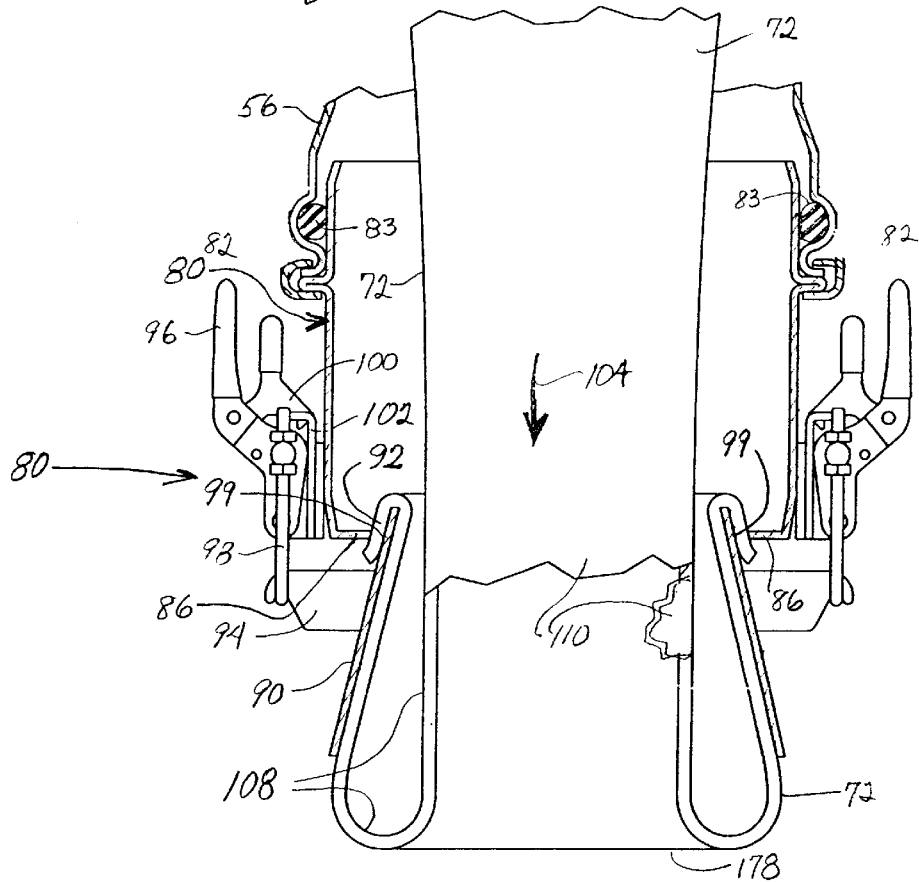
FIG. 4 is a sectional view, taken along line 4—4 of FIG. 1, showing the outlet fixture and liner clamp portions of the apparatus shown in FIG. 1, at an enlarged scale, with a tubular liner fastened to the outlet fixture of the everter box in readiness for being everted and extended.
Figure 6:
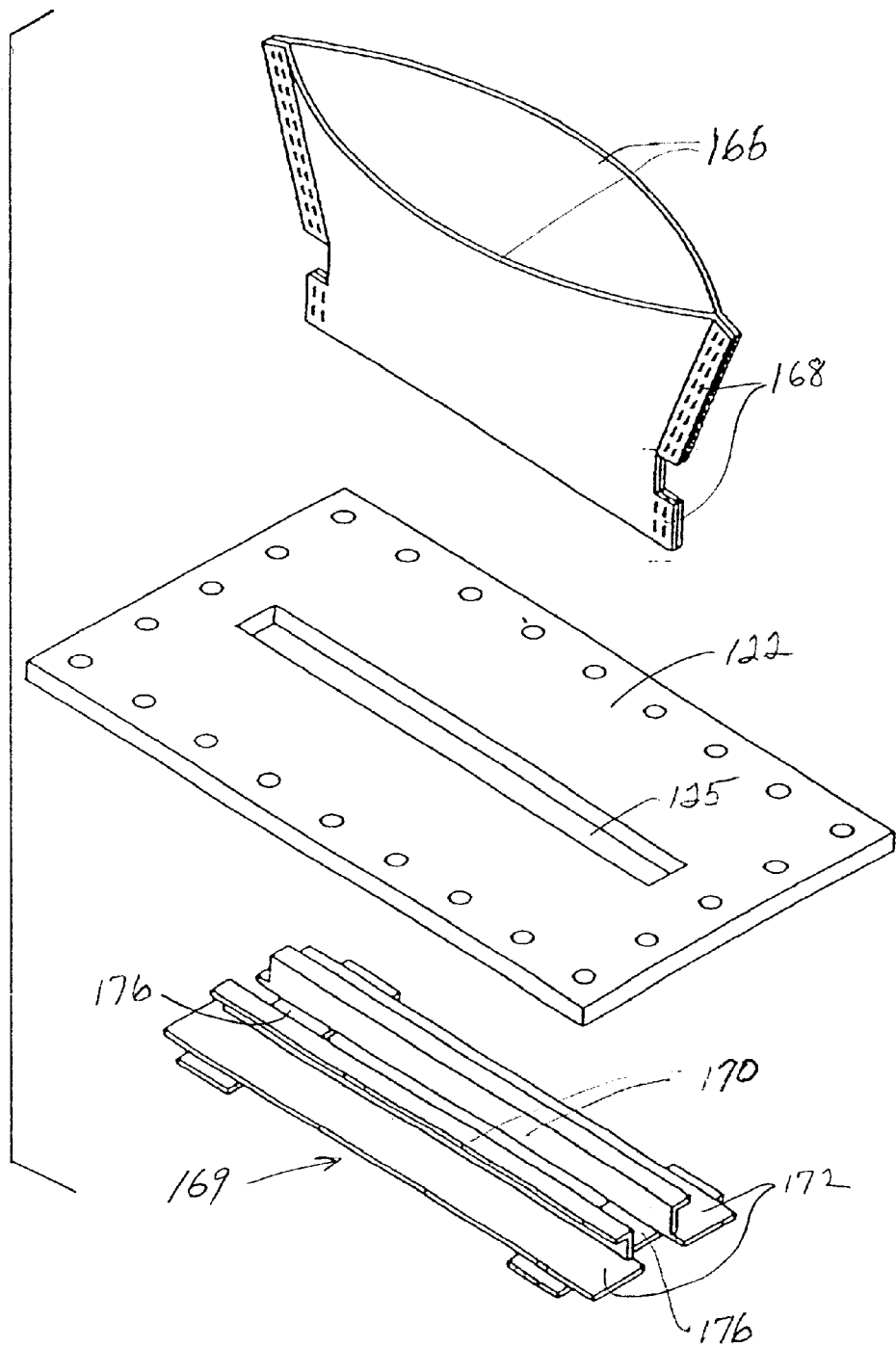
FIG. 6 is an exploded isometric view showing the cover plate, the shutter assembly, and the funnel-like liner-guiding assembly of the everter box shown in FIG. 3.
Figure 7:
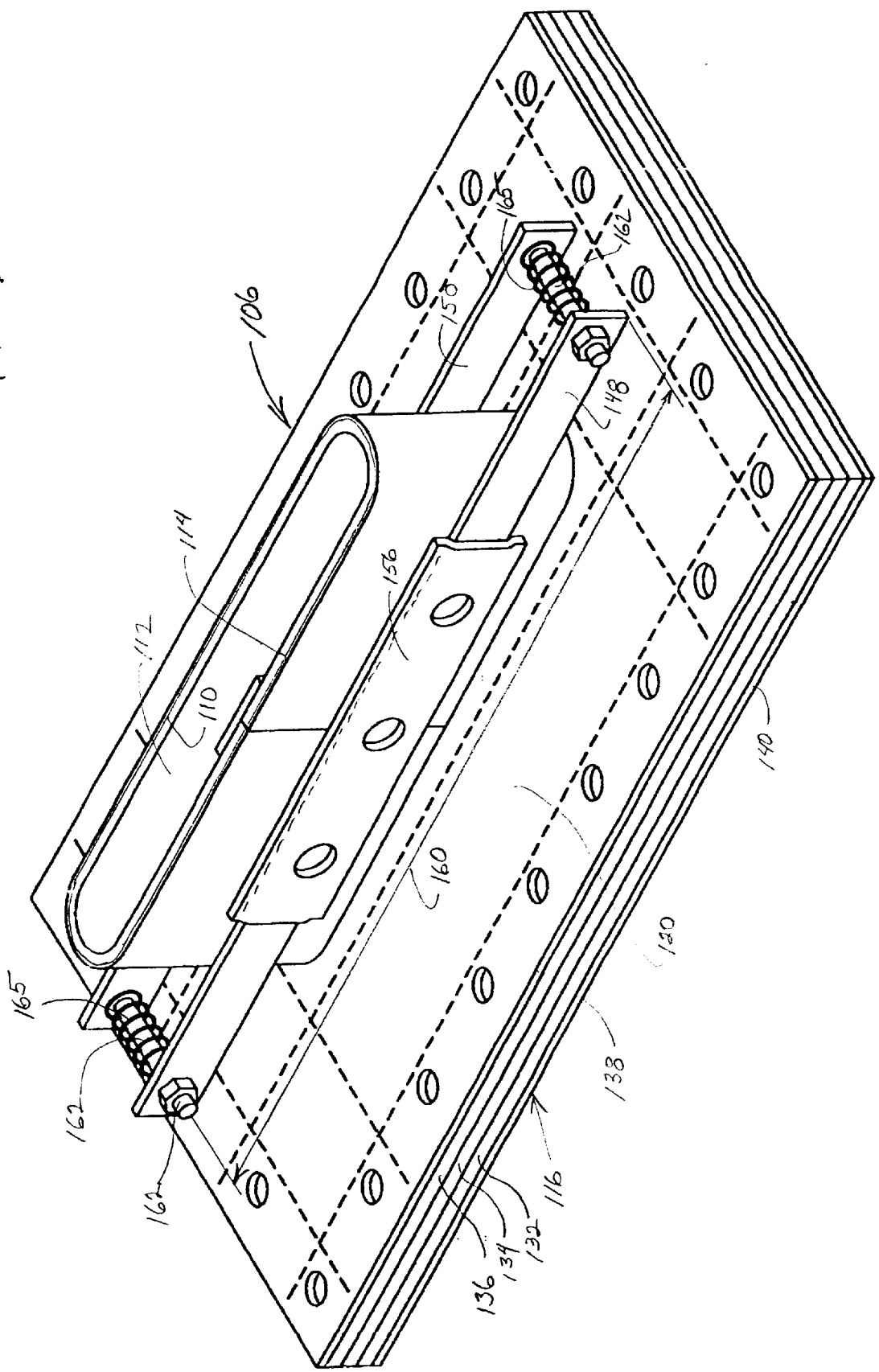
FIG. 7 is an isometric view of a base sheet assembly and associated lips of a sealing inlet port which is one embodiment of the present invention, taken from the bottom, or inner, side of the base.
Figure 8:
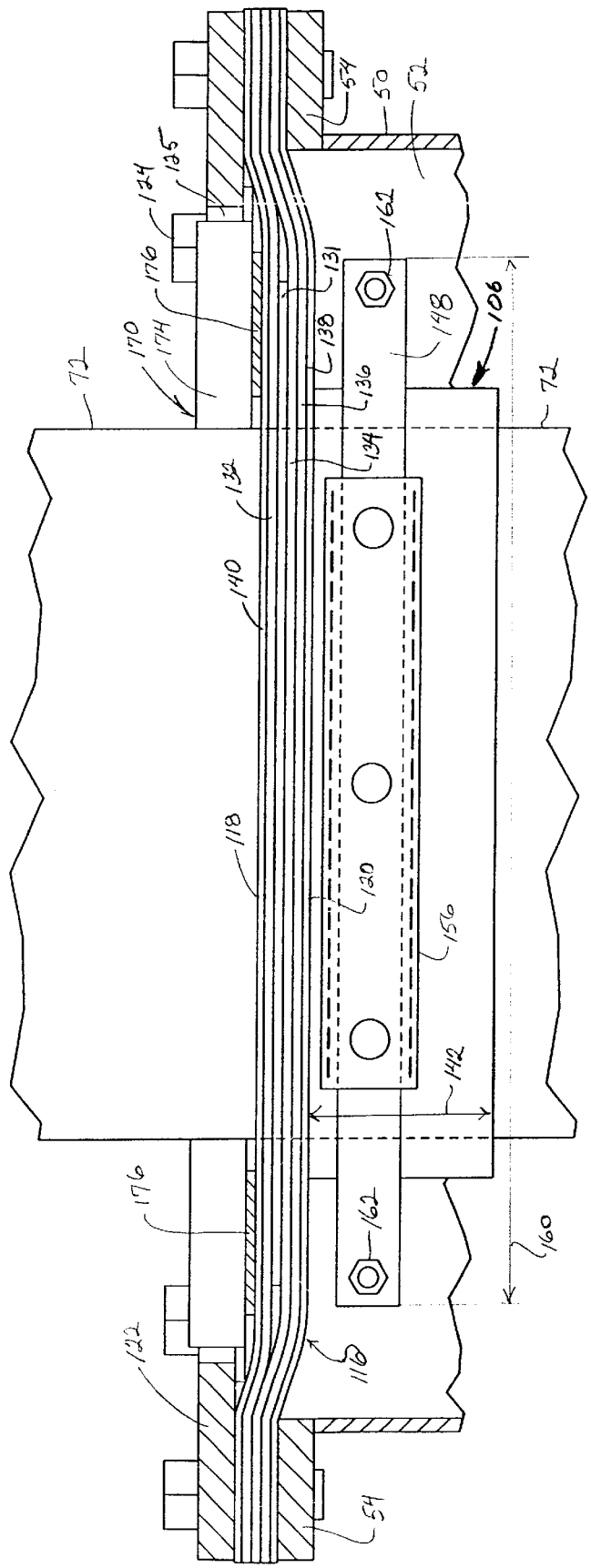
FIG. 8 is a sectional view, taken along line 8—8 in FIG. 5, at an enlarged scale, showing the sealing inlet port and a flattened tubular liner passing into the everter box through the sealing inlet port.
Figure 9:
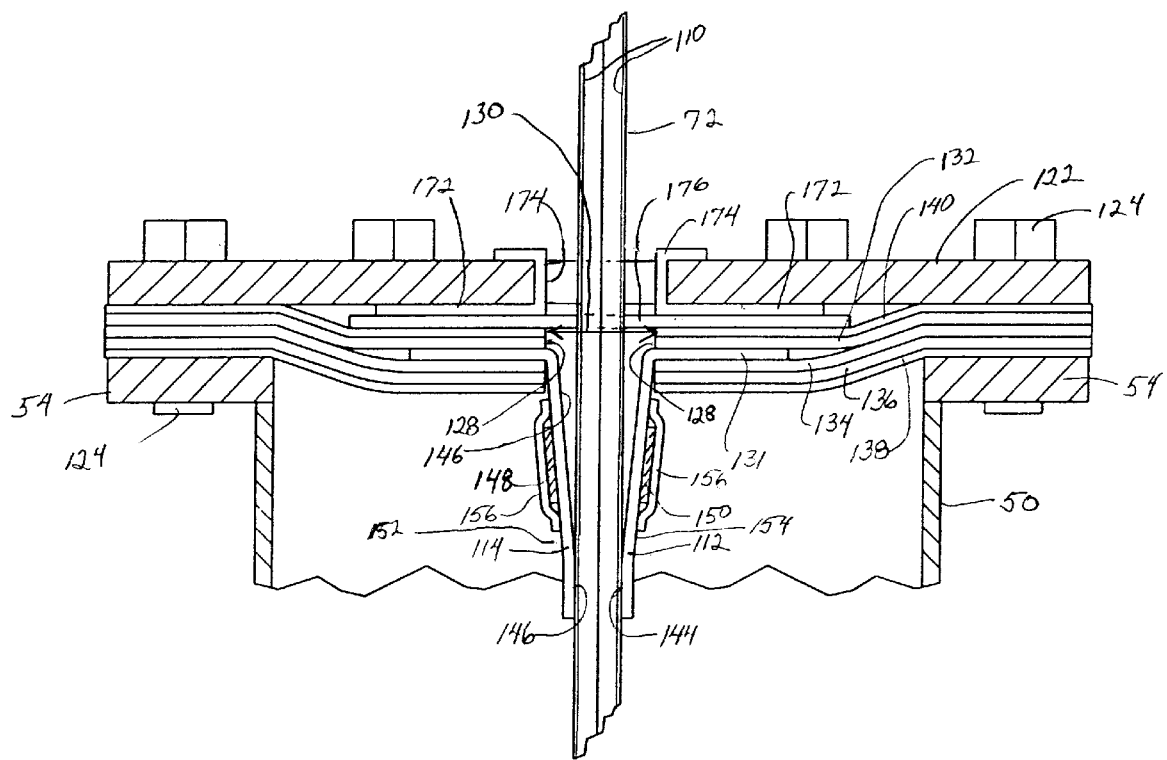
FIG. 9 is a sectional view, taken along line 9—9 of FIG. 5, showing the sealing inlet port and a flattened tubular liner passing into the everter box through the sealing inlet port.

With the smaller end of the inner tubular portion of the clamp 80 extending a small distance into the near end 92 of the liner 72 the clamp lever arms 96 are raised and latched, to grip the near end 92 of the liner between a clamping seat portion 99 of the inner tubular portion 90 and the outer clamping rim 86, as shown in FIG. 4, with sufficient force to prevent the near end 92 from becoming dislodged during operation of the everter apparatus 16. The liner 72, folding back inside the portion gripped by the clamp 80, extends downward through the interior of the inner tubular portion 90, thus being everted as more of the length of the liner 72 passes through the inner tubular portion 90 of the attachment clamp 80 in the direction indicated by the arrow 104.

At the upper end of the everter 50, the liner 72 extends downward from the space between the rollers 68 and 70 and moves into the interior of the container 52 through a sealing inlet port 106 in response to elevated fluid pressure within the container 52 acting on the surfaces 108 of the liner 72 to evert and extend it through the outfeed fixture 56. The liner 72 is typically of one or more layers of felt, usually a needled felt of polyester fibers, 3–6 mm thick, sewn into the form of a tube, with a layer 110 of a flexible polymeric plastic material such as a 10- or 15-mil polyurethane film bonded to the felt, usually by spraying the polyurethane onto the felt in a liquid state and allowing it to fuse onto and around the fibers in the outermost part of the layer of felt. The felt is usually impregnated with a quantity of an uncured resin which is contained within the liner 72 and within the plastic film layer 110 on whose surfaces 108 pressure acts within the container 52.

In one embodiment of the present invention, the sealing port 106 includes a pair of lips 112, 114, shown in FIGS. 7, 8, 9 and 10, which, in a preferred embodiment of the invention extend from a base 116 which has an outer face 118 and an opposite inner face 120. The base 116 is in the form of a base sheet assembly of multilayered construction and is attached to the flange 54 at the upper end of the container 52 by a cover plate 122 and several fasteners such as bolts 124 threaded into the flange 54. The cover plate 122 supports the base 116 when fluid pressure within the interior of the container 52 is increased with respect to the ambient air pressure surrounding the everter apparatus 16. The cover plate 122 defines a slot 125 of ample size including long parallel sides interconnected by short ends, through which the flattened liner 72 passes into the container 52.

The base 116 defines a long, narrow inlet mouth 126 which has a length 127 and a pair of opposite sides 128 generally parallel with each other and spaced apart by a distance 130 that is sufficient to permit passage of the flattened liner 72.

Figure 10:
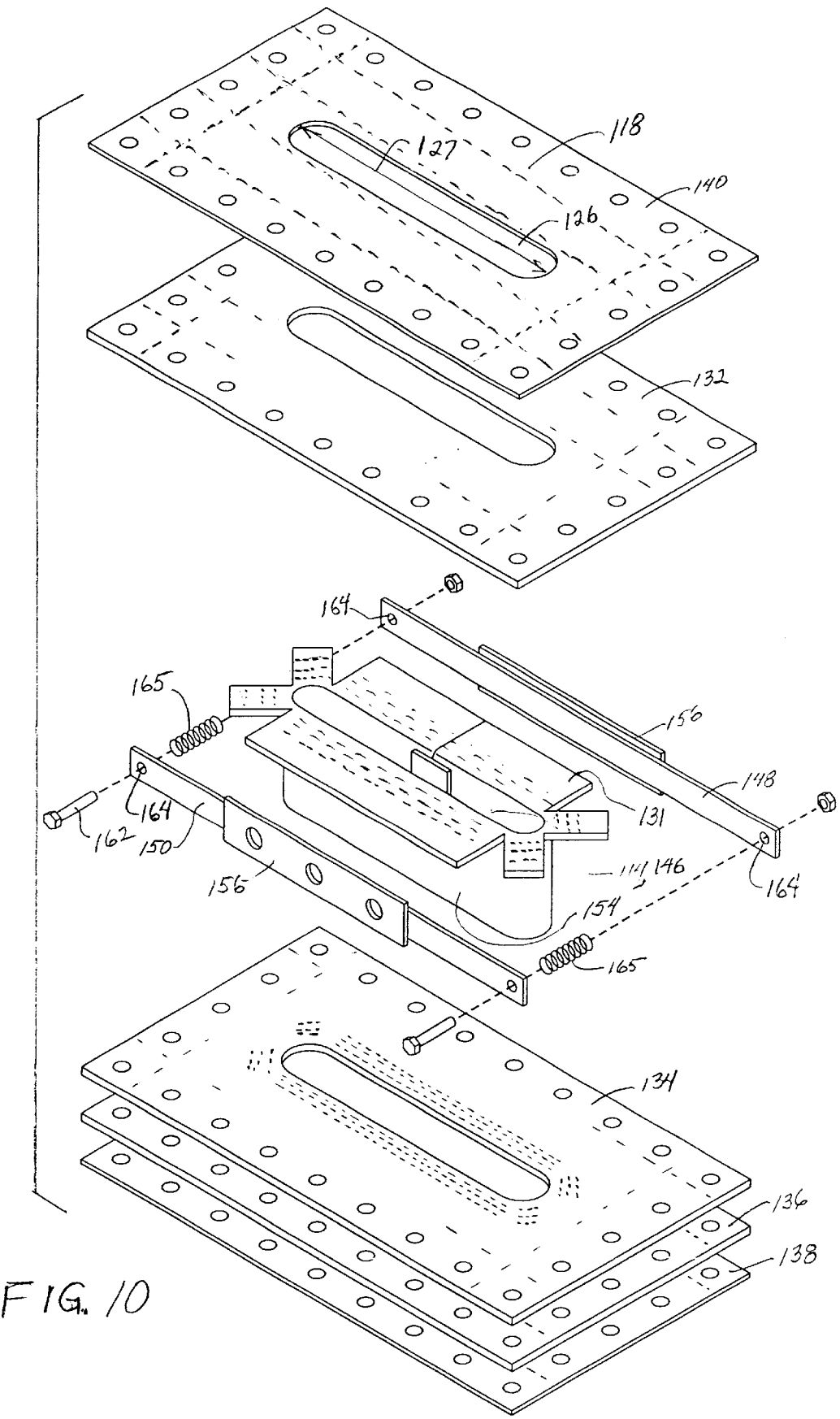
FIG. 10 is an exploded isometric view of the inlet seal shown in FIGS. 7, 8 and 9.
Figure 15:
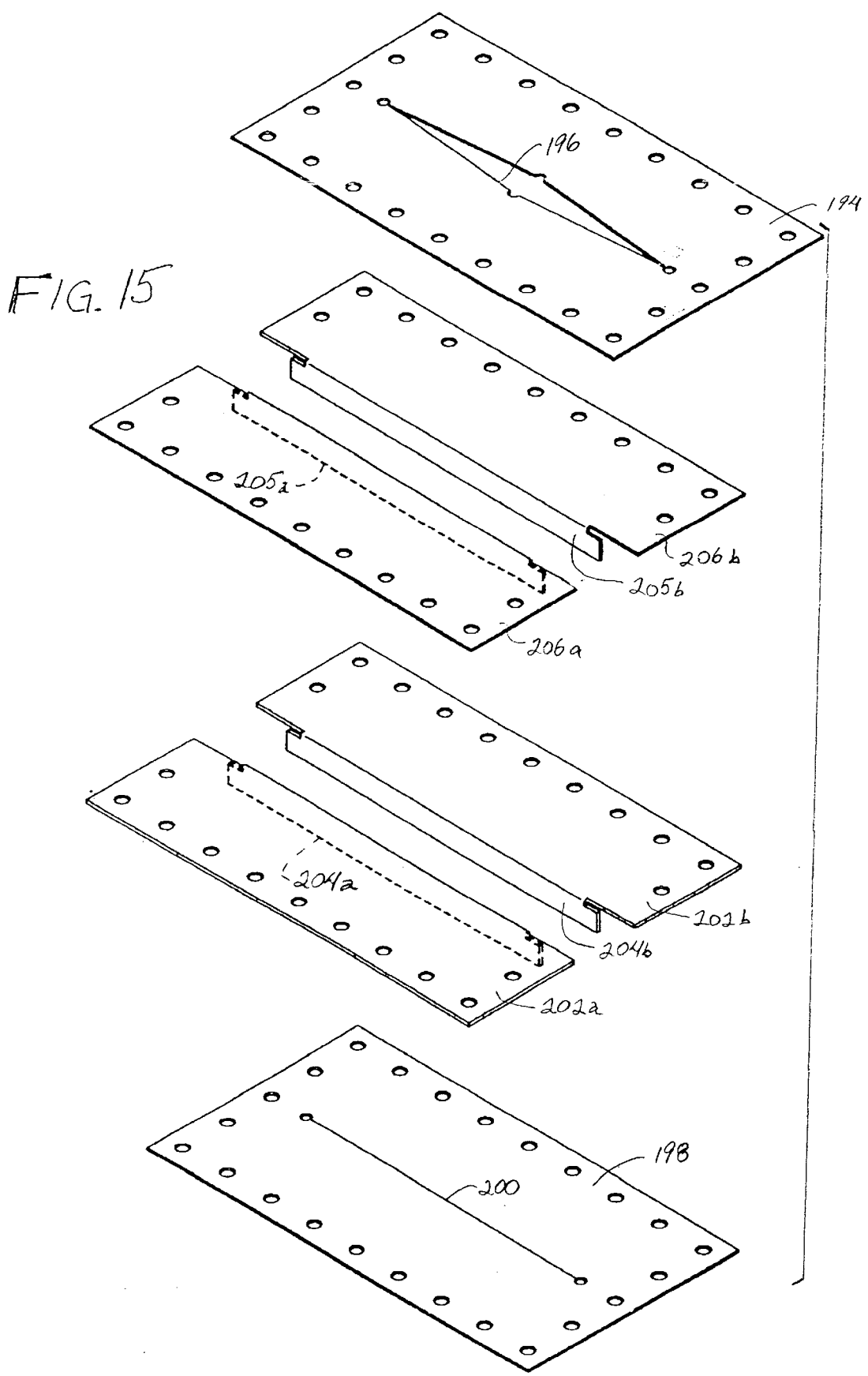
FIG. 15 is an exploded isometric view of the inlet seal assembly shown in FIGS. 12, 13 and 14.

The lips 112, 114 are included in a short tubular piece of strong flexible sheet material such as the felt of which the liner tubes are typically manufactured, and which has an attached airtight layer 110 of flexible polymeric plastic material such as an intimately adhered 10–15 mil polyurethane film. The tubular portion defining the lips 112, 114 may be made by sewing in place a small connecting piece of felt, as shown in FIG. 10. The tubular portion including the lips 112, 114 is attached to the base 116, as by sewing, with the attached end 131 of the tube opened as shown best in FIG. 10. The base 116 preferably includes a pair of layers 132, 134 of such felt with an adhered film 110 of a flexible plastic material. The base 116 may be assembled with the plastic film 110 of each layer facing toward the plastic film of the other of those two layers. Thus the polyurethane layer 110 of the layer 134 is uppermost, while the polyurethane layer 110 of the layer 132 faces downward. The opened end 131 of the tube, including the lips 112, 114, is sandwiched between the layers 132 and 134 as seen best in FIGS. 8 and 9, and the opened end portion 131 is preferably sewn to the layer 134, preferably with two or three lines of stitches, as indicated in FIG. 10, with the tube extending down through the opening in the layer 134.

A layer 136 of a rubberlike material, such as a ⅛-inch-thick silicone rubber, is located in contact with the lower layer 134 of felt and plastic, and a bottom sheet 138 of a polymeric plastic able to withstand temperatures at least as high as about 250°–300° F., such as a sheet of PTFE (polytetrafluoroethylene) $\frac{1}{32}$ inch thick, is located in contact with the layer 136 of rubber, forming the inner face 120 of the base 116. PTFE is desirable, because of its ability to withstand the temperatures which may result from the introduction of steam into the liner receiver 50 to heat the uncured resin with which the liner 72 is impregnated, in order to cause it to commence curing once it has been installed. A thicker layer 140 of plastic, such as PTFE $\frac{1}{16}$–⅛ inch thick, is located in contact with the upper layer 132 of felt and plastic and includes the outer face 118 of the base 116. All of the layers may then be sewn together.

The lips 112, 114 extend generally parallel with each other away from the base 116 in an inward direction, toward the interior of the container 52, for a distance 142, which may also be referred to as a length of each lip 112, 114. The distance 142 is preferably in the range of 1 to 6 inches, depending on the size of the liner 72, and is, for example, about 3¼ inches, when the distance 130 between the opposite sides 128 of the mouth 126 is 1½ inches, so that there is ample area in the lips 112, 114 to be acted upon by the fluid contained under pressure within the container 52, to urge the lips 112, 114 toward each other so that their mutually confronting sealing surfaces 144, 146 are forced to bear against the surfaces 108 of the liner tube 72 where it extends through the sealing port 106.

The lips 112, 114 are supported by elongate resiliently flexible supporting members 148, 150 extending along the exterior surfaces 152, 154 of the lips 112, 114. Each of the support members 148, 150 may be a steel strap 0.5 inch–1.375 inch wide and 0.075–1.125 inch thick, for example, and is attached to the respective lip 112 or 114 by extending through a tube defined by a strip 156 of flexible material, preferably the same sort of felt material of which the lips 112, 114 are made. The strips 156 are attached preferably by being stitched along their margins, leaving a space wide enough to admit the support member 148 or 150.

Each support member 148, 150 has a length 160 somewhat greater than the length of the mouth 126, and a fastener such as a bolt and nut combination 162 extending through holes 164 interconnects the support members 148, 150 with each other loosely, to establish a maximum separation between them. The support members 148, 150 thus prevent the lips 112, 114 from being forced out through the mouth 126 when the container 52 is pressurized.

A helical compression spring 165 is preferably located on each bolt 162 between the support members 148 and 150, urging them apart from each other toward the position of maximum separation permitted by the bolts 162 or equivalent fasteners. The support members 148, 150 thus serve to urge the lips 112, 114 apart from each other, counteracting a portion of the force of fluid under pressure within the container 52 to reduce friction acting on the surface of the liner 72 as it passes into the interior of the liner everter box 50, but with a small enough force that the lips 112, 114 are not prevented from forming a seal. Thus the support members 148, 150 prevent the lips 112, 114 from being forced out through the mouth 126 yet permit their sealing surfaces 144, 146 to be pressed into contact with each other and against the surfaces 108 of the liner 72 being everted.

The sealing surfaces 144 and 146 are preferably lubricated to facilitate passage of the liner 72 through the sealing inlet port 106, by impregnating the felt of the lips 112, 114 with a lubricant such as a silicone lubricant having a kinematic viscosity of 100,000 centistokes, available from Dow Corning, as its Series 200 silicone lubricant.

A liner such as the liner 72 is typically prepared by impregnating the felt layers with the appropriate uncured thermosetting resin, with the polymeric plastic film layer outermost, containing the resin. The liner is then placed in a refrigerated container to prevent the resin from curing until the liner has been properly installed within a conduit to be repaired. Since the length of a liner may be up to several hundred feet, small amounts of air contained within a liner may accumulate and form a bubble within a liner 72 outside the liner everter box 50. Because of the cooperation of the rollers 68 and 74, such a bubble will usually remain between the rollers and the container in which the liner is stored prior to installation. To provide additional guiding support to keep the liner 72 properly aligned and flattened as it enters the liner everter 50, however, a pair of convergent guiding members 166 may be provided on the outside of the cover plate 122. The guiding members 166 may preferably be made of a low-friction sheet polymeric plastic material thick enough to provide ample support considering the size of the liner 72, and preferably may be of PTFE 1/16 inch thick, and thus they also act as slip sheets. They are generally fan-shaped, with margins 168 interconnected as by being sewn together to form a flattened funnel leading into the slot 125 defined in the cover plate 122. The funnel formed by the guiding members 166 squeezes the liner 72, should it contain a significant bubble, urging the liner 72 into its required flattened form so that it can pass through the sealing inlet port 106. The guiding members 166 may extend only a short distance into the mouth 126, or in another embodiment of the invention may extend further into the cavity defined within the interior of the container 52.

Preferably, an adjustable slot filler assembly 169 is provided to adjust the size of the slot 125 extending through the cover plate 122. Such a filler assembly preferably includes a pair of opposite shutters 170 that are similar to each other. Each has a flat base portion 172 extending along the inner surface of the cover plate 122, and an upstanding wall portion that stiffens the shutter 170 and extends upward into the slot 125 to narrow it to approximate more closely the size of a flattened liner 72. Two opposite flat end plates 176 extend transversely with respect to the shutters 170 and may be moved toward or away from each other adjacent to the ends of the slot 125 to reduce the length of the slot 125 similarly to more closely approach the size of the flattened liner tube 72 where it enters into the liner receiver 50 through the sealing port 106. The shutters 170 and end plates 176 fit snugly between the base portion 116 and the cover plate 122, so that once they are adjusted to the size of a particular liner 72 they will remain in the desired position, particularly when the interior of the container 52 is subjected to increased fluid pressure which will urge the base 116 more tightly into contact against the end plates 176, shutters 170, and cover plate 122.

When the first or near end 92 of the liner 72 is held by the clamp 80 as shown in FIGS. 1–4, with the flattened liner 72 extending into the everter box 50 through the sealing inlet port 106, increasing the fluid pressure, as by introducing compressed air into the interior of the liner everter box 50, will urge the liner 72 out from the container 52 through the outfeed fixture 56 and the appropriately installed attachment clamp 80, with the liner 72 being everted at its furthest extended portion as shown at 178 in FIGS. 2, 3 and 4. Fluid pressure within the interior of the liner everter 50 in excess of ambient air pressure will also urge the lips 112 and 114 toward each other and into contact with the portion of the liner 72 extending into the liner everter box 50 through the sealing port 106, preventing escape of the compressed air or other fluid under pressure from inside the liner everter box 50, yet permitting the liner 72 to slip between the lips 112 and 114 on its way into the everter box 50 and toward the outfeed fixture 56 at the bottom of the container 52. Preferably, as shown in FIG. 2, where a conduit 179 to be repaired extends away from one side of a manhole 180 whose base is wider than the opening at ground level, the liner 72 will extend at an angle of inclination with respect to the vertical, and the liner receiver 50 is able to tilt somewhat to accommodate that path of the everted liner 72.

Once the entire length of the liner 72 has passed through the sealing port 106 into the liner everter box 50, a tail rope 182 attached to the tail, or far end of the liner 72 can also be allowed to pass into the liner everter 50 through the sealing inlet port 106, which will also create a sealing closure around the tail rope 182. Tension can be maintained in the tail rope to control the speed at which the liner 72 is carried along the interior of the conduit 179 as it continues to be everted within the conduit. Such control is desirable to assure that the liner 72 is subjected to sufficient pressure while eversion within the conduit is allowed to take place. The tail rope 182 may be extended around one of the rollers 68 and 74 and allowed to slip at the desired speed around a cleat 184 located on the exterior of the liner receiver box.

Once the liner 72 has been everted completely to the far end of the section of conduit 179 being repaired, the far end of the liner 72 can be sealed and contained as necessary to maintain pressure within the liner 72 and permit heat to be provided to the interior of the liner 72 in the conduit 179 to commence the curing of the resin. Depending on how heat is intended to be applied to the interior of the conduit with the everted liner in place, it may also be desirable to utilize the tail rope 182 to pull a lay-flat hose 186 toward the far end of the everted liner 72 so that hot water, steam, or heated air can be carried through the lay-flat hose 186 to the far end of the section of conduit being repaired. Such a lay-flat hose 186 may also be moved through the sealing port 106 together with the tail rope 182.

Referring now to FIGS. 11–15, a sealing port 190 is of slightly different construction from that of the previously described sealing port 106. The sealing port 190 is used by being installed in the same manner as the sealing inlet port 106, between the flanges 54 and the cover plate 122, shutters 170 and end plates 176, and is also similarly supported by attachment to the flange 54 using the bolts 162. A base portion 192 is of multilayered construction including a top sheet 194 of felt with an adhered plastic film as described above. A slot 196 defined in the top sheet 194 is diamond-shaped, wider at midlength than at its ends, and may include circular stress-relief portions at each end and in the middle to make tearing of the material less likely. A bottom sheet 198 of elastic rubber-like material such as a silicone rubber material about ⅛ inch thick includes a slit 200 also having stress relieving circular openings at its ends. A lower intermediate layer 202 includes a pair of separate sheets 202a and 202b, each located on a respective side of the slit 200 and each including a respective lip portion 204a, 204b, extending downward through the slit 200. The separate parts 202a and 202b of the lower intermediate layer are of a flexible, strong, and fairly thick material such as the previously described felt material commonly used as the material of the tubular liners 72 and which includes an adhered layer of a polymeric plastic material such as 10–15 mil polyurethane film on the upper side of the lower intermediate sheet part. An upper intermediate sheet 206 is of a low-friction polymeric plastic material such as PTFE in two parts 206a and 206b, shaped similarly to the parts 202a and 202b, and may be ¹/₃₂ inch to ¹/₁₆ inch thick. Lip portions 205a and 205b are included and extend through the slit 200 overlying the lip portions 204a, 204b. The top sheet 194 is also of such felt with an attached film of polymeric plastic. The several layers of the base portion 192 are stitched together, and the ends 207 of the lips 204a, 204b, 205a, 205b, are also stitched together, keeping the lips aligned with each other, and the lips are also supported and resiliently urged together by the bottom sheet 198, as seen best in FIG. 14

Figure 14:
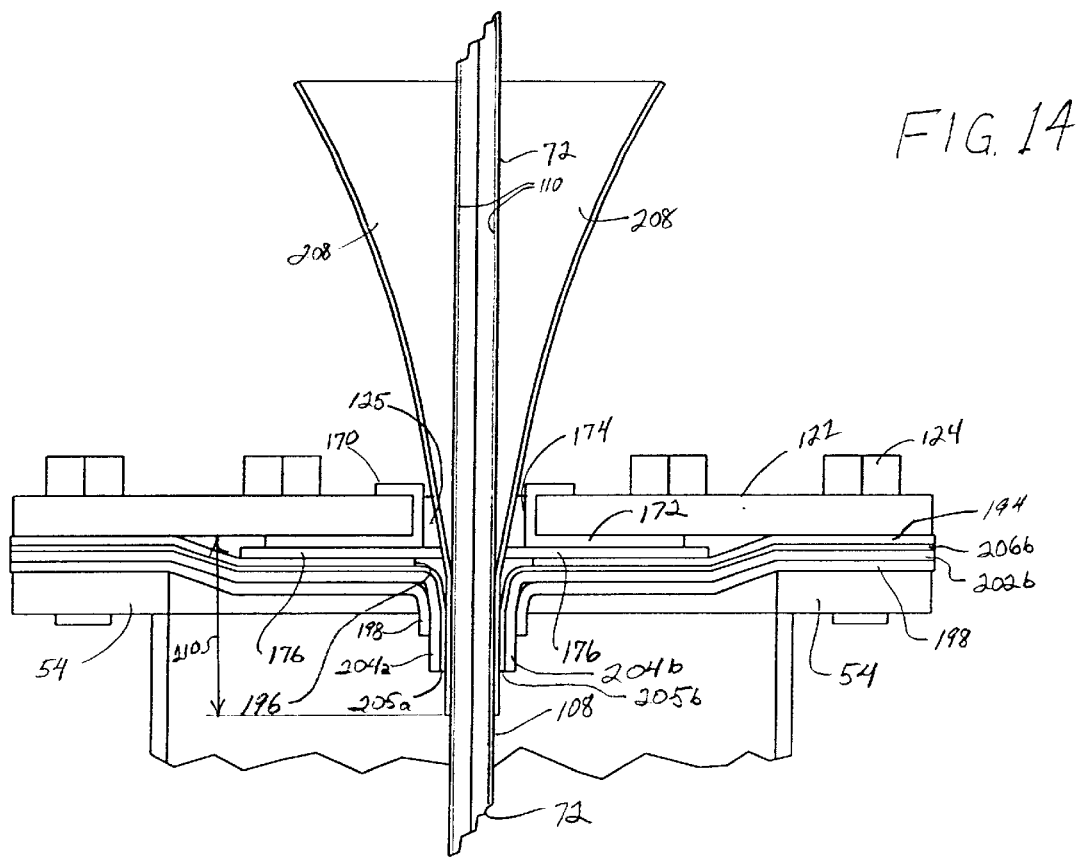
FIG. 14 is a sectional view, taken along line 14—14 of FIG. 11, showing the inlet seal shown in FIG. 12 installed in the upper end of the everter box, together with the liner-guiding assembly.

A pair of fan-shaped guiding members 208 of low-friction plastic sheet material such as PTFE material, similar to the guiding members 166, extend above the cover plate 122 and also extend into the container 52 between the lip portions 204a and 204b, preferably extending into the interior of the container 52 to a distance 210 extending beyond the bottom margins of the lips 204a, 204b, as shown in FIG. 14.

Instead of assembling the parts of the sealing inlet port 190 as just described, it would also be possible to mold in combination a base and a pair of sealing lips of a suitable rubber or rubber-like plastic material of appropriate flexibility and hardness to be pressed sealingly against a liner tube 72 and an associated tail rope 182 and lay-flat hose 186.

Various connector fittings are provided on the walls of the liner everter box 50 to accept hoses or pipes as necessary to deliver compressed air, steam, or water to the interior of the container 52 to fill the. liner 72 and thus force it to evert itself and extend into a conduit being repaired using the apparatus 16 of the invention. A pressure gauge 212 is also provided, preferably protected by an appropriate shield to prevent damage during use of the apparatus. It will be understood that various valves will also be necessary to control the amount of air, steam, or water delivered to the liner receiver 50.

Ordinarily, the pressure required within the container 52 to extend and evert a liner 72 for a conduit being repaired with a nominal inside diameter of eight inches, using a double thickness felt liner, will be about 10 psig. Since the pressure is fairly low, then, the lips 112, 114 of the sealing inlet port 106 must be flexible enough to conform to the liner 72 as it passes through the port into the interior of the liner everter 50, to prevent excessive leakage. It will be understood, however, that some leakage will still be acceptable and is unavoidable.

Figure 16:
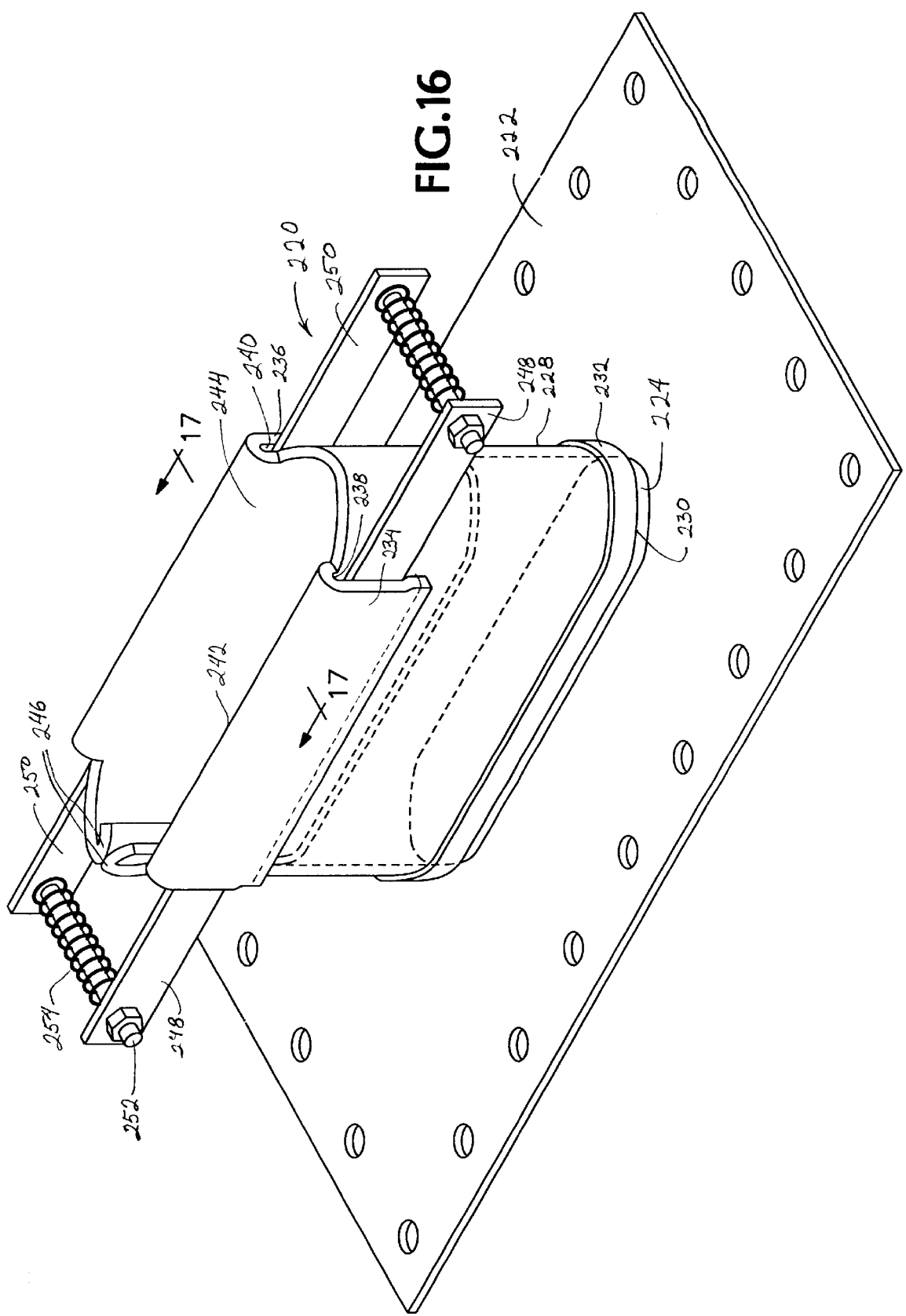
FIG. 16 is an isometric view of a sealing inlet port that is another embodiment of the invention, shown inverted.
Figure 17:
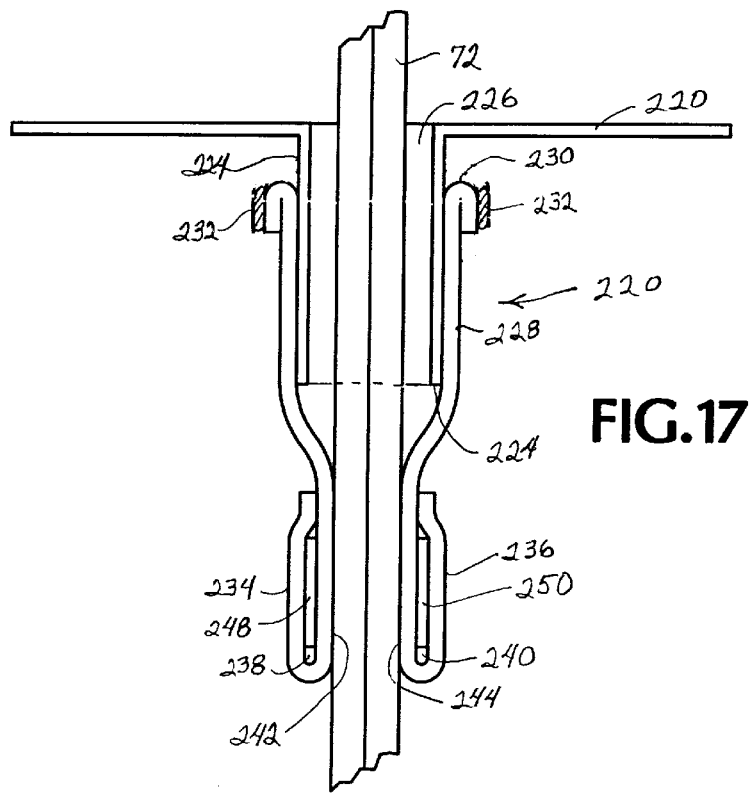
FIG. 17 is a section view, taken on line 17—17, of FIG. 16, showing the inlet port in its actual orientation as when in use.

Referring now to FIGS. 16 and 17, a sealing inlet port 220 is shown in FIG. 16 inverted from its normal orientation at the top of a liner everter container 52. The sealing inlet port 220 includes a base portion 222 which may be of sheet aluminum, shaped and perforated to fit atop the flange 54, together with an appropriate gasket (not shown). It will be apparent that with appropriate spacers and gaskets (not shown), the cover plate 122 and the shutter assembly 169 can be used together with the sealing port 220, as could the guiding members 166.

Extending from the base plate 222 is a support tube 224 which may be of a modified oval shape and which is welded to the base plate 222 along the margin of a similarly-shaped mouth 226. Fitted snugly around the support tube 224 is a sleeve 228 of flexible sheet material, which may be material similar to that of which the liner 72 is constructed. A base margin 230 of the sleeve is fastened to the support tube 224, as by a suitably tensioned hose clamp 232. At the opposite end of the sleeve 228 a pair of flaps 234 and 236 are folded back along the outside of the sleeve 228 and stitched to the material of the sleeve to form a pair of tubes 238, 240, each extending alongside a respective lip 242, 244. overlying margins 246 of the material of which the sleeve 228 is made may be sewn together to form the sleeve after the flaps 234, 236 have been sewn to form the tubes 238, 240.

Supporting members 248, 250 extend respectively through the tubes 238 and 240. The supporting members 248 and 250 may be similar to the supporting members 148, 150 described above, and are interconnected with each other similarly by fasteners such as bolt-and-nut combinations 252 extending through respective bores defined in the supporting members 248, 250. Compression springs 254 are fitted around the bolts 252 and serve to urge the supporting members apart from each other in the manner previously described to prevent the lips 242, 244 from pressing against a liner tube with too much pressure and thereby causing excessive friction.

Figure 18:
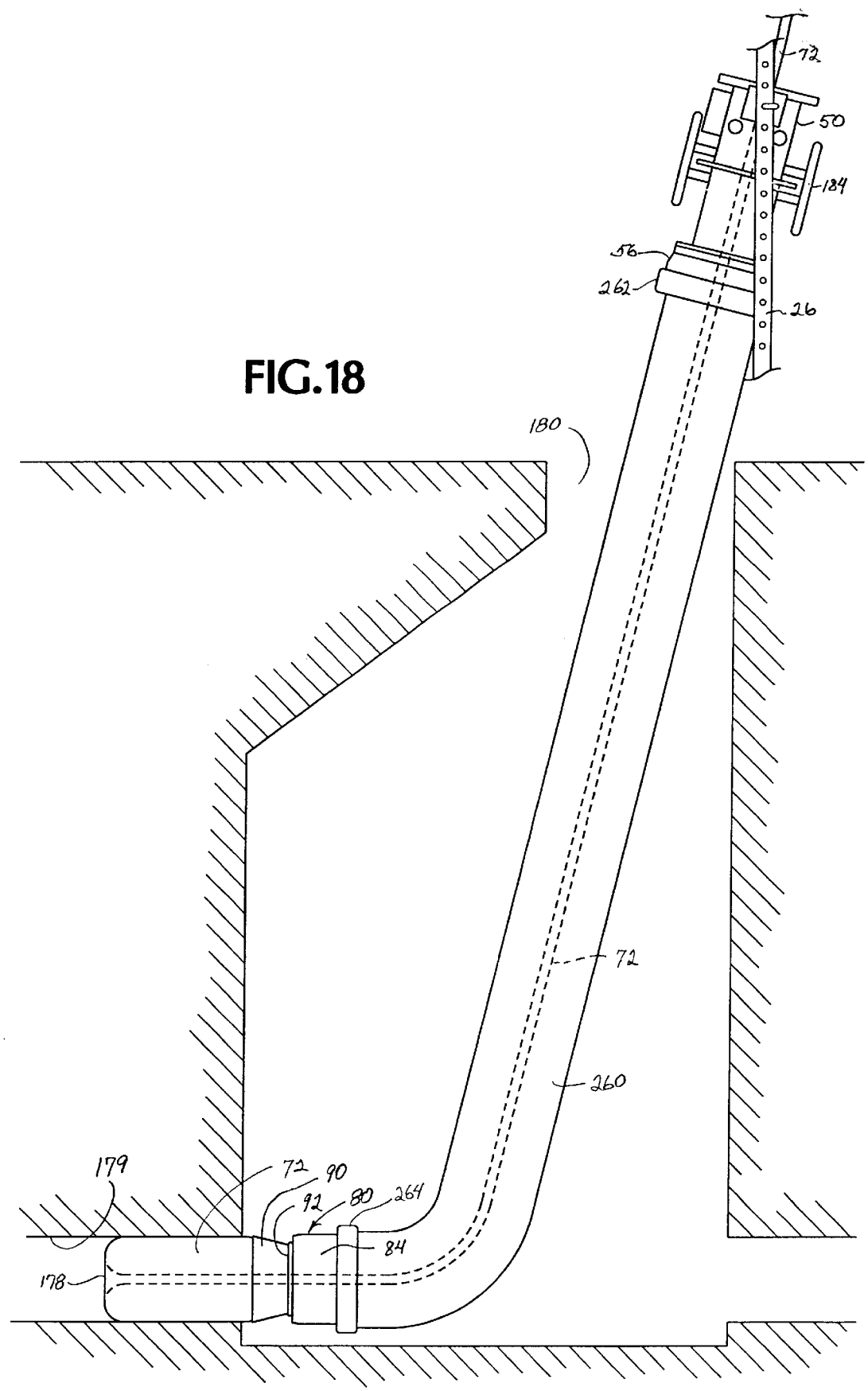
FIG. 18 is a semi-diagrammatic representation of apparatus which is another embodiment of the invention, showing its use in installing a liner tube into a subterranean conduit.

As shown in FIG. 18, in one embodiment of the invention a flexible tubular conduit 260 is attached to the outfeed fixture 56 by a coupling 262, and the attachment clamp 80 is attached to the opposite end of the flexible conduit 260 by a coupling 264, so that the rear end 92 of the liner 72 may be held by the attachment clamp 80 at a location more immediately adjacent to the conduit 179 which is to be repaired by insertion of the liner 72. The flexible conduit 260 may be of any flexible substantially airtight material capable of withstanding the pressures and temperatures utilized in extending and everting the liner 72, such as material similar to that of which the liner 72 may be constructed, that is, strong felt with a coating of polyurethane to make the material airtight. Use of the flexible conduit 260 between the liner everter container 52 and the open end of the conduit 179 saves the expense of preparation of a length of liner material equal to the length of the conduit 260 and saves the expense of treating such a section of liner material with the required resin. Utilization of the liner everter box 50 with the flexible conduit 260 attached is the same as with the near end 92 attached to the attachment clamp 80 immediately adjacent to the outfeed fixture 56, except that the near end 92 of the liner 72 first needs to be pulled through the flexible conduit 260 and then attached to the attachment clamp 80.

Figure 19:
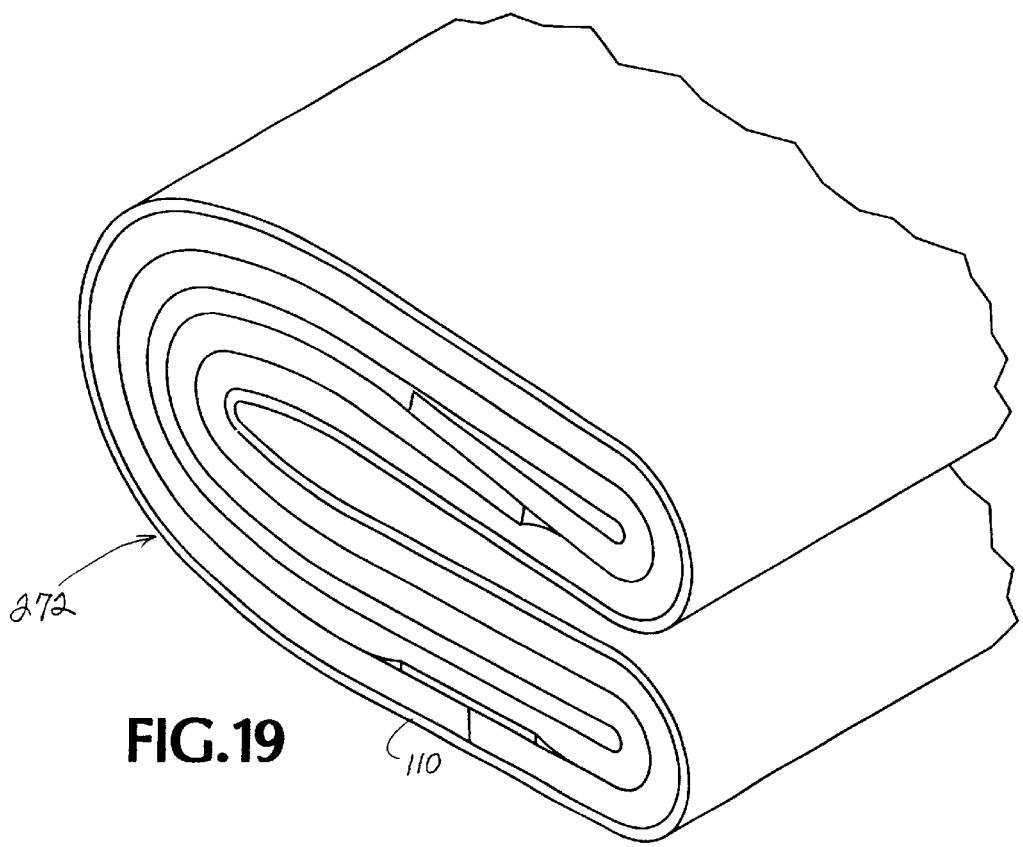
FIG. 19 is an isometric end view of a tubular liner in a folded configuration.

When utilizing the apparatus of the present invention for installation of a liner tube 72 for a conduit being repaired which is of a smaller inside diameter, such as 6–10 inches, the liner tube 72 may be folded flat as shown in FIGS. 1–4. Instead, and particularly for repair of larger conduits, such as 12 inches and larger in diameter, utilizing the apparatus of the present invention, a liner 272 may be folded into a "U" or flattened "C" configuration as shown in FIG. 19. This configuration presents significantly less outer surface upon which the lips of the sealing inlet port 106 or 190 or 220 are brought to bear frictionally by the pressure of fluid contained within the liner everter container 52 so that the liner 272 exposes less surface to the lips and can slide through the sealing inlet port without less friction. The liner 272 can thus be extended and everted without having to increase the pressure on the fluid within the liner everter container 52 more than is desirable.

The apparatus described enables a liner 72 or 272 to be extended and everted by use of air pressure within the liner everter container and the portions of a liner which have been extended and everted, as will be desirable in most cases. In the installation of larger sizes of liners into conduits being repaired it may also be desirable to use water within the liner during installation to reduce friction between the surfaces of the moving portion of the liner against the already-everted portions of the liner within the conduit 179.

Using the apparatus of the invention just described it is possible to install and evert tubular liners to repair conduits quickly and inexpensively, without the need for such large equipment as that described in the prior art, Wood, U.S. Pat. No. 4,064,211.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for use in everting a flexible tubular liner into the interior of a hollow conduit, comprising:
    (a) a liner everter container having a bottom end having an outfeed element defining an outfeed opening and having a top end including an opening through which a liner can be fed into the liner everter container;
    (b) a liner inlet port assembly associated with said top end, and including:
        (i) a pressure bearing cover member defining an inlet slot having a pair of opposite elongate sides and a pair of opposite ends interconnecting said sides;
        (ii) a base sheet assembly mounted in said liner everter container beneath said cover member and defining an inlet mouth; and
        (iii) a pair of flexible lips interconnected with said base sheet assembly, located on opposite sides of said mouth and facing toward each other, said lips extending a first distance into said liner everter container toward said bottom end, said first distance being great enough for mutually confronting portions of said lips to be pressed sealingly against each other by fluid pressure within said liner everter container in excess of ambient atmospheric pressure surrounding said liner everter container; and
    (c) a liner attachment clamp associated with said outfeed opening and adapted to interconnect a first end of a liner sealingly to said liner everter container.

2. The apparatus of claim 1, including a pair of slip sheets of low-friction material extending through said slot and between said lips.

3. The apparatus of claim 2 wherein said slip sheets extend from a location outside said liner everter container through said slot to a location that is at least said first distance inside said liner everter container.

4. The apparatus of claim 2 wherein said slip sheets have respective upper margins located outside said liner everter container and spaced apart from each other and wherein said slip sheets extend into said liner everter container between said lips and face toward each other.

5. The apparatus of claim 4 wherein said slip sheets are interconnected with each other and form a funnel having a mouth thereof located outside said liner everter container.

6. The apparatus of claim 2 wherein said slip sheets are of a polymeric plastic sheet material.

7. The apparatus of claim 6 wherein said plastic sheet material is PTFE.

8. The apparatus of claim 1, including a support frame having a base and an upstanding support member, said liner everter container being mounted on said upstanding support member.

9. The apparatus of claim 8 wherein said base of said support frame defines a central opening and said outfeed opening of said liner everter container is located above said central opening.

10. The apparatus of claim 8 wherein said support frame includes a pair of removable generally horizontal extension members each having a support leg attached thereto.

11. The apparatus of claim 8, including base-supporting wheel mounted rotatably on a strut mounted adjustably on said base portion of said support frame.

12. The apparatus of claim 8, including a roller mounted on said support frame above said liner everter container and defining a liner passage for said tubular liner substantially directly from said roller to said slot of said liner everter container.

13. The apparatus of claim 8, including mounted rotatably on said support frame a pair of rollers spaced apart from each other and defining therebetween a liner passage located above said slot and aligned therewith so that said tubular liner can extend downward substantially directly from said liner passage through said slot into said liner everter container.

14. The apparatus of claim 1, further including an adjustable slot filler associated with said slot and obscuring a selected portion of said slot.

15. The apparatus of claim 14, wherein said slot filler includes a shutter disposed movably within said slot and between said pressure bearing cover member and said base sheet assembly.

16. The apparatus of claim 1 wherein each of said lips includes a layer of felt and a layer of a flexible substantially airtight material attached to a side of said layer of felt.

17. The apparatus of claim 16 wherein said felt is impregnated with a lubricant acting to facilitate movement of said liner between said lips and into said liner everter container.

18. The apparatus of claim 1 wherein said slot has a length and each of said lips has a pair of opposite ends separated by a distance greater than said length of said slot, and wherein a respective portion of each of said opposite ends of a first one of said lips is fastened to a confronting similar portion of each of said opposite ends of the other one of said pair of lips.

19. The apparatus of claim 1, including a liner attachment clamp interconnected with said bottom end of said liner everter container, said liner attachment clamp including an upper sleeve including an outer clamping seat and an inner tubular portion including a tapered inner clamping seat extending within said outer clamping seat with sufficient clearance to receive a near end portion of said tubular liner between said inner clamping seat and said outer clamping seat, and a clamping linkage interconnecting said inner tubular portion with said upper sleeve and releasably urging said inner clamping seat toward said outer clamping seat so as to securely grip said near end portion of said liner while said liner extends outward from said liner everter container through said inner tubular portion.

20. The apparatus of claim 1, including a pair of elongate supporting members of material stiffer than said lips, a respective one of said supporting members being attached to each one of said lips, said inlet mouth having a length and at least one of said supporting members extending beyond said length of said mouth.

21. The apparatus of claim 20 including at least one fastener interconnecting said supporting members and establishing a maximum separation distance therebetween.

22. The apparatus of claim 1, including a pair of elongate supporting members, a respective one of said supporting members being attached to each one of said lips, and at least one spring being associated with said supporting members, urging said supporting members apart from each other and thereby urging said lips apart from each other in opposition to any force exerted on said lips by a fluid under pressure surrounding said lips and tending to urge said lips toward each other.

23. A sealing inlet port for a container, for permitting movement of an elongate flexible article therethrough into said container, comprising:
  (a) a base having an outer face and an inner face and defining an elongate mouth extending therethrough, said mouth having a pair of opposite sides;
  (b) a pair of flexible lips of sheet material attached to said base and projecting from said inner face of said base in a generally inward direction, each of said lips having an exterior side facing away from the other of said lips and a sealing surface facing toward the other of said lips;
  (c) a pair of elongate supporting members, a respective one of said supporting members being attached to each of said lips and located adjacent to said exterior side thereof.

24. The sealing inlet port of claim 23 including at least one spring associated with said supporting members, urging them apart from each other and thereby urging said lips apart from each other in opposition to any force exerted on said lips by a fluid under pressure surrounding said lips and tending to urge said lips toward each other.

25. The sealing inlet port of claim 23, including a pair of tubes, a respective one of said tubes being located on said exterior side of each of said lips, and a respective one of said supporting members each extending through each of said tubes and thereby being attached to one of said lips.

26. The sealing inlet port of claim 23, including an adjustable fastener interconnecting said supporting members with each other and establishing a maximum separating distance therebetween.

27. The sealing inlet port of claim 23, including a rigid backing member supporting said outer face of said base, said backing member defining an inlet opening aligned with said mouth.

28. The sealing inlet port of claim 27, including a pair of convergent guiding members associated with said backing member, each of said guiding members having a layer of a low friction polymeric material including a guiding surface.

29. The sealing inlet port of claim 28 wherein said polymeric material is PTFE.

30. The sealing inlet port of claim 27, including a pair of shutters, each including a portion thereof located between said base and said backing member and adjacent to a respective one of said opposite sides of said mouth, each of said shutters being movable with respect to said backing member to a position in which it partially obstructs said inlet opening.

31. The sealing inlet port of claim 23 wherein said base is of multilayered construction including a sheet of rubber-like material.

32. The sealing inlet port of claim 23 wherein said lips are parts of a flattened tube and wherein respective ends of said lips are interconnected with each other, thereby completing said flattened tube.

33. The sealing inlet port of claim 23 wherein each of said lips includes a respective layer of felt.

34. The apparatus of claim 22 wherein said support members and said at least one spring support said lips sufficiently to limit frictional forces of said lips on said liner to an amount less than a balance of extending and everting forces remaining and tending to pull said liner into said liner everter container through said liner inlet port when all other forces resisting extension and eversion of said liner are deducted from extending and everting forces resulting from said fluid pressure within said liner everter container.

35. The apparatus of claim 1 wherein said lips create frictional forces of said lips on said liner limited to an amount less than a balance of extending and everting forces remaining and tending to pull said liner into said liner everter container through said liner inlet port when all other forces resisting extension and eversion of said liner are deducted from extending and everting forces resulting from said fluid pressure within said liner everter container.

36. The apparatus of claim 1, including an elongate flexible conduit interconnecting said liner attachment clamp with said outfeed element of said bottom end of said liner everter container, said flexible conduit being large enough for a liner to pass therethrough from said outfeed element to said liner attachment clamp.

37. The apparatus of claim 1, including a rope controlling cleat mounted on an exterior portion of said liner everter container.

* * * * *